April 27, 1948.                I. W. FOLK                    2,440,505
   INTERLOCKING MEANS FOR ELECTRICAL TESTING APPARATUS OR THE LIKE
                        Filed April 18, 1946
*Fig. 1*
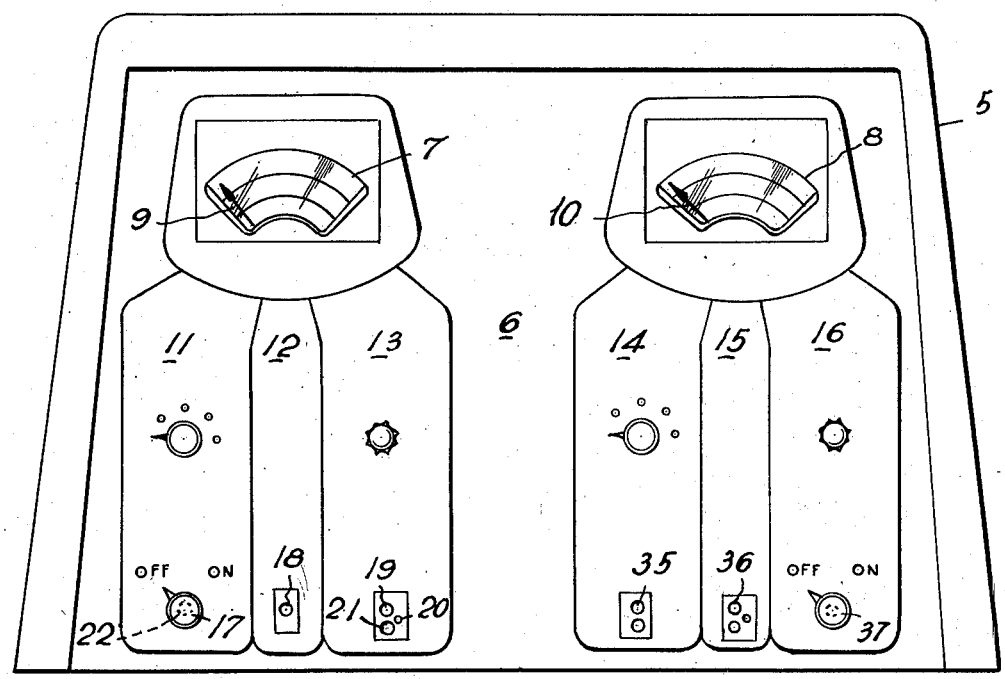
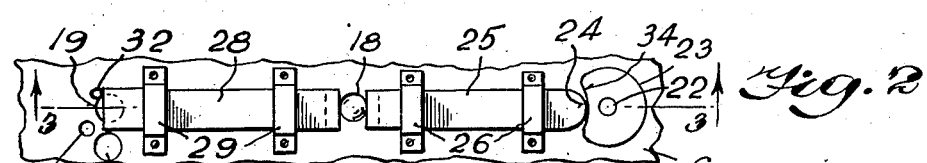
*Fig. 2*
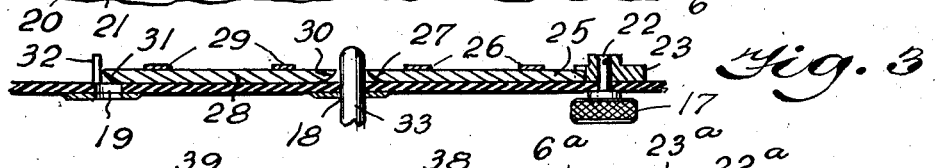
*Fig. 3*
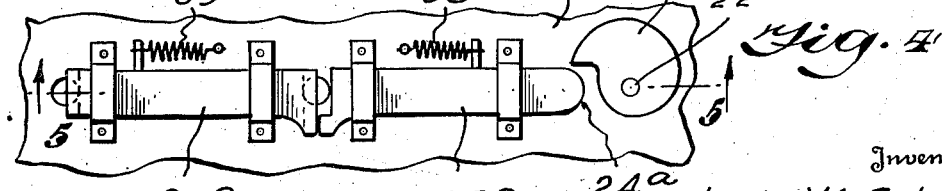
*Fig. 4*
Inventor
Irvin W. Folk,
By Barry + Cyr.
Attorneys Patented Apr. 27, 1948

2,440,505

UNITED STATES PATENT OFFICE 2,440,505

INTERLOCKING MEANS FOR ELECTRICAL TESTING APPARATUS OR THE LIKE

Irvin W. Folk, Belleville, N. J., assignor to Atlas Supply Company, Newark, N. J., a corporation of Delaware Application April 18, 1946, Serial No. 662,949

5 Claims. (Cl. 74—483)

This invention relates to improvements in electric testing apparatus, and more particularly to interlocking means to prevent the hooking-up of two circuits simultaneously.

In a previous application, Serial No. 645,439, filed February 4, 1946, I have disclosed an electrical apparatus to aid mechanics in servicing automobiles and the like, and as these mechanics, at filling stations, for example, make a great many adjustments, repairs, and replacements of minor parts on automobiles, test and charge batteries, and provide a variety of service, I supplied an apparatus to aid them in these tasks. Such apparatus involves various circuits controlled by the insertion of plugs or the turning of knobs, and the primary object of the present invention is to provide apparatus of this character with means to prevent more than one circuit being used at a time.

Another object of the invention is to provide mechanical means to prevent the insertion of more than one plug in the apparatus at one time and to obstruct the turning of a knob while a plug occupies any one of the plug-receiving sockets.

With the foregoing object outlined and with other objects in view which will appear as the description proceeds, the invention consists in the novel features hereinafter described in detail, illustrated in the accompanying drawing, and more particularly pointed out in the appended claims.

The invention is illustrated in connection with a motor analyzer having a group of test circuits measured by one multiscale meter and combined with other parts, but after the details are understood, it will be appreciated that my present invention can be employed in various environments.

In the drawing:

Fig. 1 is a front elevation of a motor analyzer which may be of the type disclosed in my above-mentioned application.

Fig. 2 is an enlarged elevation of one suitable interlocking means for my present purposes.

Fig. 3 is a horizontal sectional view, taken on the line 3—3 of Fig. 2.

Fig. 4 is a view like Fig. 2, but illustrating another modification.

Referring to the drawings, 5 designates a casing of a motor analyzer provided with a front panel 6 having dial windows 7 and 8 through which test pointers or indicators 9 and 10 may be viewed while cooperating with the dials. In the present disclosure, each meter is combined with three types of testing means, as in my previous application, and by way of explanation, the part 11 of the panel may be used in connection with a condenser test; the part 12 for an engine speed test; 13 for a distributor test; 14 a coil test; 15 a voltage test; and 16 for exhaust gas analysis. Reference will now be made to the structure at the left side of the panel in which the condenser testing is controlled by a handle or knob 17, the engine speed by the insertion of a plug into the socket 18, and the distributor by the insertion of a plural pronged plug into the sockets 19, 20 and 21.

As best shown in Figs. 2 and 3, a shaft 22, controlled by knob 17 and arranged at the rear of the panel 6, is provided with a fixedly mounted cam 23, coacting with the arcuate end 24 of a sliding bolt 25 guided by keepers 26 fixed to the rear of the panel, and provided at its opposite end with an inclined surface 27, facing the panel 6.

A second bolt 28 is slidably arranged in keepers 29 and in alignment with the bolt 25 so that these bolts can act to move one another endwise when their adjacent ends contact. The bolt 28 is provided at one end with an inclined surface 30 and at its opposite end with an inclined surface 31, both of which confront the rear face of the panel. These bolts are adapted to obstruct the plug holes 18 and 19, and stop 32 is fixed to the panel to limit shifting of the bolts in one direction.

As shown in Fig. 3, the prong 33 of the plug for an engine speed test has been inserted in the hole 18 and its extremity has engaged the ends 27, 30 of the bolts to move them in opposite directions so that one end of the bolt 28 obstructs the hole or socket 19 to prevent insertion of a plug in that hole, while the extremity 24 of the other bolt is moved into a notch 34 of the cam 23 to prevent the knob 17 from being turned from "off" to "on" position, as will be evident from Fig. 1.

When the prong 33 is removed, it is obvious that the insertion of the prongs of a plug into the holes 19, 20 and 21, will cause the prong entering the hole 19, to engage the ramp 31 and push the bolt 28 into a position where it will obstruct the hole 18 and engage the adjacent end of the bolt 25 so as to prevent the insertion of a plug into hole 18 or the turning of the shaft 22.

If the plug is removed from the holes 19, 20 and 21, it is evident that the knob 17 can be turned from "off" to "on" position and the turning of the cam 23 will cause the bolt 25 to obstruct the hole 18 and to prevent the bolt 28 from moving out of the position where it obstructs hole 19.

From the foregoing explanation, it is believed the construction and operation of the interlocking means for the meters may be readily understood, and it is manifest that if the structure shown in Figs. 2 and 3, is employed with the holes 35 and 36 and the knob 37 of the other meter, such structure will accomplish the same result.

In the modification shown in Fig. 4, the bolts 25a and 28a are always urged toward a neutral position, by equally tensioned springs 38 and 39, each having one of its ends connected to the panel 6a and its opposite end connected to one of the bolts. Here the bolt 28a need only be provided with inclined surfaces corresponding with the surfaces 30 and 31, and the arcuate end 24a of the other bolt can cooperate with a differently shaped cam 23a, fixed to the shaft 22a that is controlled by a knob such as 17 or 37. In view of the explanation in Figs. 2 and 3, the functioning of the embodiment illustrated in Fig. 4, will be understood without further information.

While I have disclosed what I now consider to be some preferred embodiments of the invention in such manner that they may be readily understood by those skilled in the art, I am aware changes may be made in the details disclosed without departing from the spirit of the invention, as expressed in the following claims:

What I claim and desire to secure by Letters Patent is:

1. In a structure of the character described, a panel provided with spaced plug-receiving sockets and a rotatable member that is spaced from the sockets, a first bolt slidably mounted on the panel between said member and one of the sockets and adapted to be moved in one direction to obstruct one of the sockets when the rotatable member is turned and to lock the rotatable member against turning when a plug occupies that socket, and a second bolt slidably mounted on the panel in alignment with the first bolt and adapted to be moved in one direction by a plug introduced into the last-mentioned socket and to be moved in the opposite direction by a plug introduced into the other socket.

2. In a structure of the character described, a panel provided with first and second sockets and a rotatable member arranged in spaced relation to one another, the rotatable member having a cam-shaped periphery, a bolt slidably mounted on the panel and movable in one direction by the rotatable member to obstruct the first socket, and movable in the opposite direction by a plug introduced into the first socket so as to lock the rotatable member against rotation, and a second bolt slidably mounted on the panel in alignment with the first bolt and operable in opposite directions by plugs introduced into the sockets.

3. A structure of the character described, comprising a panel having first and second sprockets and a rotatable cam arranged in spaced relation to one another, a pair of bolts arranged in end-to-end relation between the second socket and the cam and slidably mounted on the panel, the bolts being adapted to shift one another endwise and one of the bolts being arranged to obstruct the first socket, the parts being so constructed and arranged that the bolts will obstruct the sockets and prevent plugs being inserted in them while the rotatable member is in a predetermined position and will prevent the rotatable member from moving to that position while a plug occupies either one of said sockets.

4. A structure as claimed in claim 3, including spring means for yieldingly holding the bolts in a neutral position.

5. Interlocking means for electrical testing apparatus comprising, a panel having spaced sockets, a rotatable shaft spaced from one of said sockets and aligned therewith, a cam carried by said shaft, a bolt aligned with the shaft and the sockets mounted for lengthwise sliding movement on the panel to engage said cam at one end thereof, a ramp on the other end of the bolt adjacent one socket, a second bolt aligned with the first bolt mounted for lengthwise sliding movement on the panel, a ramp on one end of the second bolt adjacent the first socket, and a ramp on the other end of the second bolt adjacent another socket.

IRVIN W. FOLK.

REFERENCES CITED

The following references are of record in the file of this patent:

UNITED STATES PATENTS

| Number | Name | Date |
|---|---|---|
| 406,212 | Hambay | July 2, 1889 |
| 1,340,930 | Catlin | May 25, 1920 |
| 2,080,964 | Forstrom | May 18, 1937 |

FOREIGN PATENTS

| Number | Country | Date |
|---|---|---|
| 535,023 | France | Apr. 7, 1922 |